US 6,609,422 B1

(12) United States Patent
Geschwender

(10) Patent No.: US 6,609,422 B1
(45) Date of Patent: Aug. 26, 2003

(54) RAIN GAUGE WITH HORIZONTAL INDICATOR

(76) Inventor: Robert C. Geschwender, 6301 Rolling Hills Blvd., Lincoln, NE (US) 68512

( * ) Notice: Subject to any disclaimer, the term of this patent is extended or adjusted under 35 U.S.C. 154(b) by 0 days.

(21) Appl. No.: 09/457,321

(22) Filed: Dec. 8, 1999

(51) Int. Cl.$^7$ .................................................. G01W 1/00
(52) U.S. Cl. .................................................. 73/170.22
(58) Field of Search .................... 73/170.17, 170.18, 73/170.21, 170.22, 170.23, 319, 320, 322.5, 305, 309

(56) References Cited

U.S. PATENT DOCUMENTS

| 2,964,943 | A | * | 12/1960 | Anderson | 73/170.22 |
| 4,233,841 | A | * | 11/1980 | Abele | 73/171 |
| 4,313,345 | A | * | 2/1982 | Abele | 73/431 |
| 4,520,667 | A | * | 6/1985 | Nelson | 73/171 |
| 4,582,083 | A | * | 4/1986 | Steinhardt | 137/398 |
| 4,919,165 | A | * | 4/1990 | Lloyd | 137/78.2 |
| 5,038,606 | A | * | 8/1991 | Geschwender et al. | 73/171 |
| 5,284,052 | A | * | 2/1994 | Thompson | 73/170.21 |

FOREIGN PATENT DOCUMENTS

JP        03238324    * 10/1991 ............. 73/309

OTHER PUBLICATIONS

Rain Cones, E–708 and E–706, Enduro Catalog, 1993; p. 28.
E–Z Read Jumbo Rain Gauge, Catalog page from B & L Industries; U.S. Patent 5,038,606.

* cited by examiner

Primary Examiner—William Oen
(74) Attorney, Agent, or Firm—Vincent L. Carney

(57) ABSTRACT

A rain gauge includes a cylindrical rain holder having a float in the rain holder and a rainfall value indicator arranged so that as the float moves vertically in the rain holder a pointer moves circumferentially to indicate the amount of rainfall. A cover for the rain holder includes an opening that is less in area than the area of the surface of water in the rain holder, whereby the water level in the rain holder raises less than but in proportion to the rainfall. The pointer is on the float and the float is mounted to a vertical screw so as to rotate as it floats vertically, whereby the pointer points to lettering on the rain holder wall indicating the amount of rainfall. The pitch per inch of the screw is proportional to the ratio of the area of the surface of water in the rain holder to the area of the opening.

9 Claims, 5 Drawing Sheets

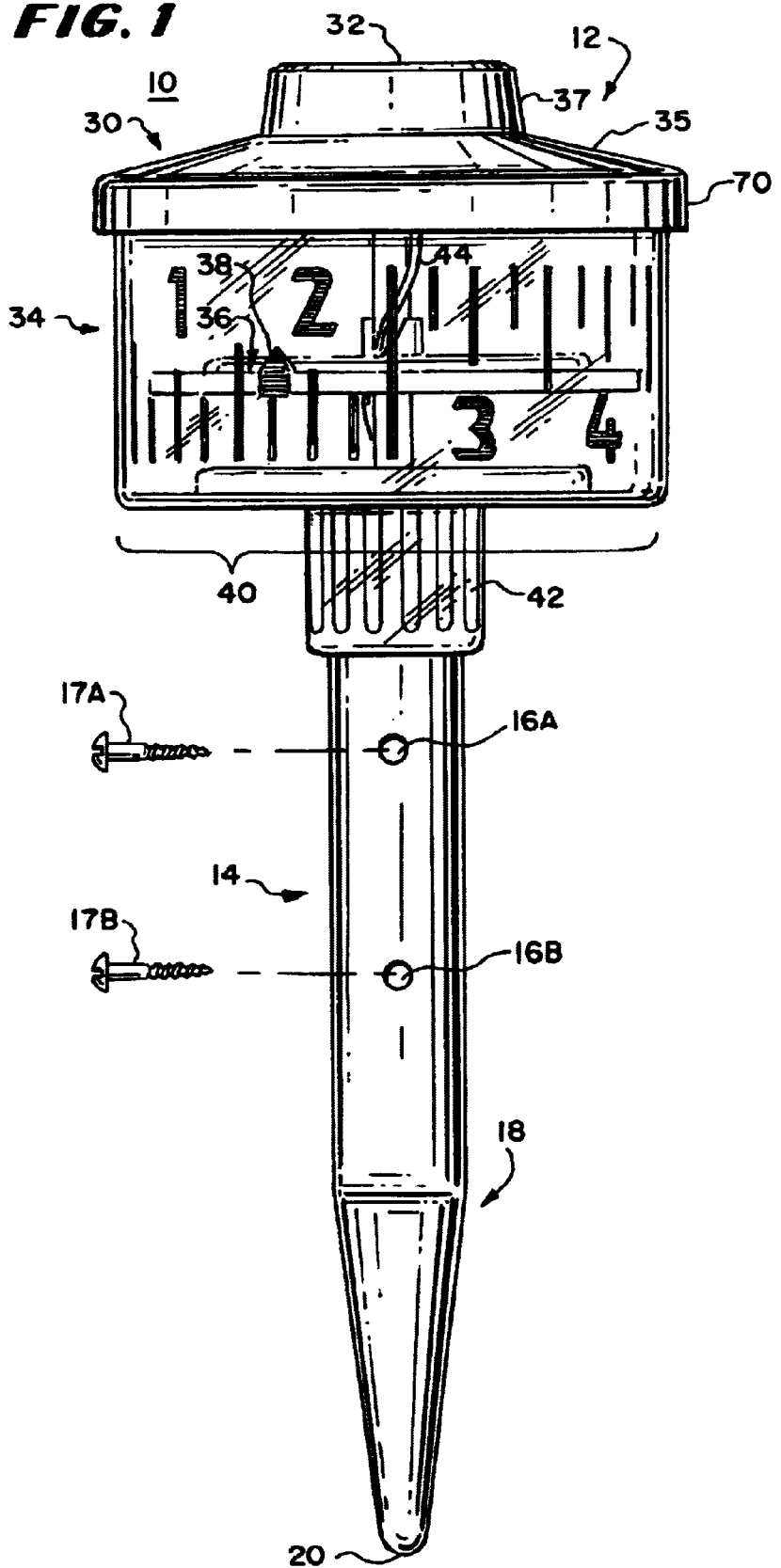

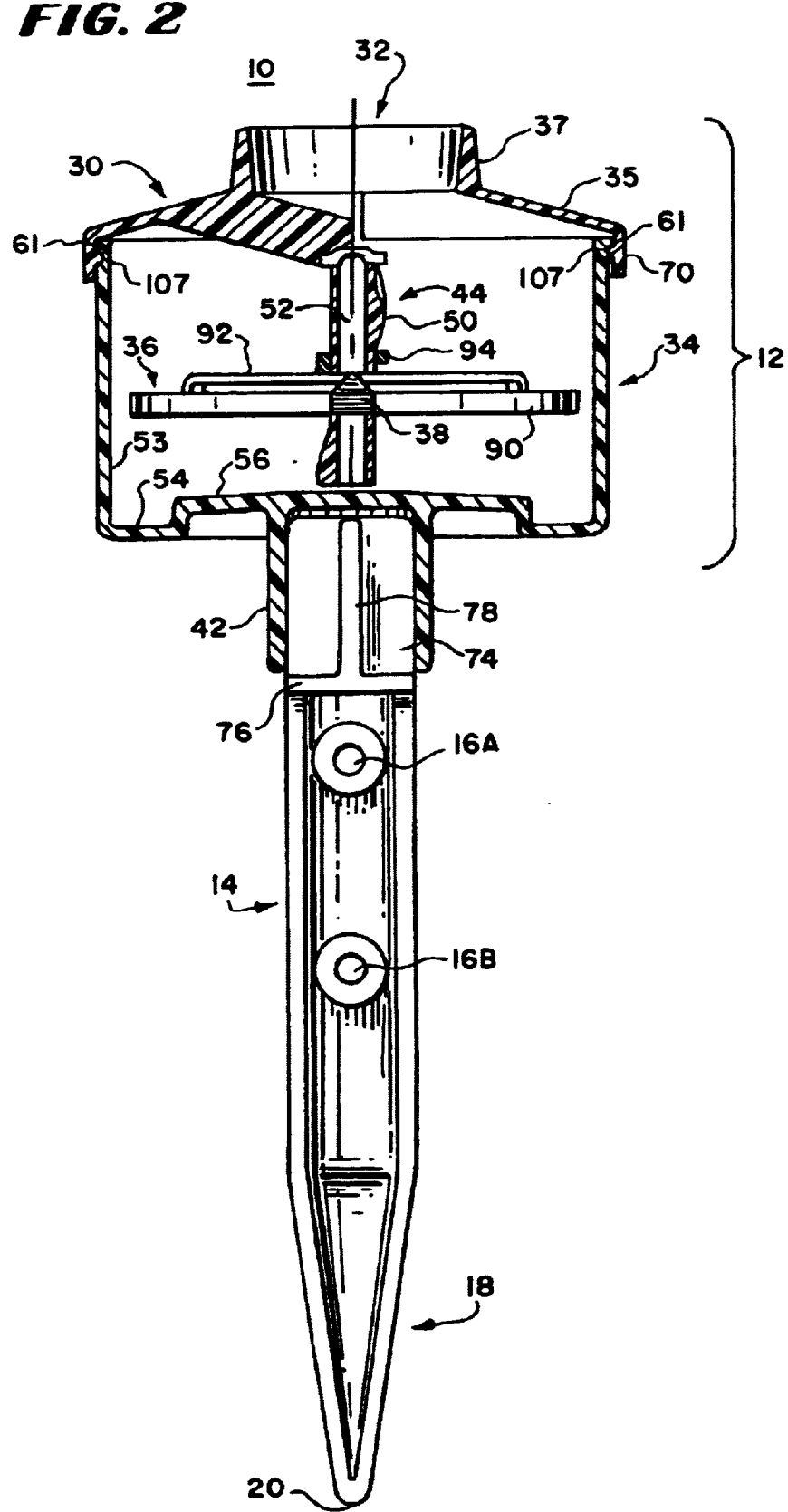

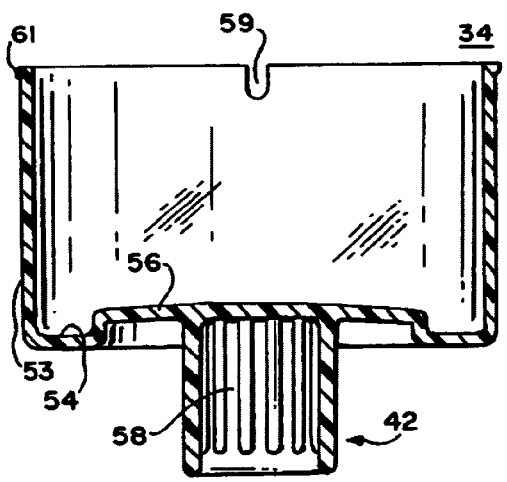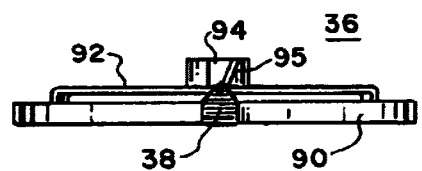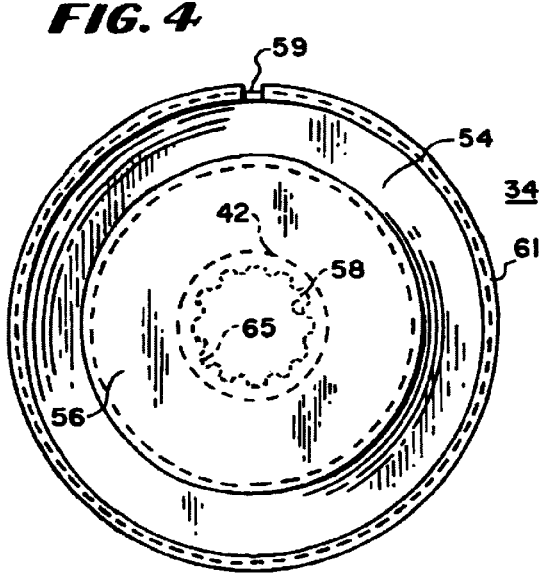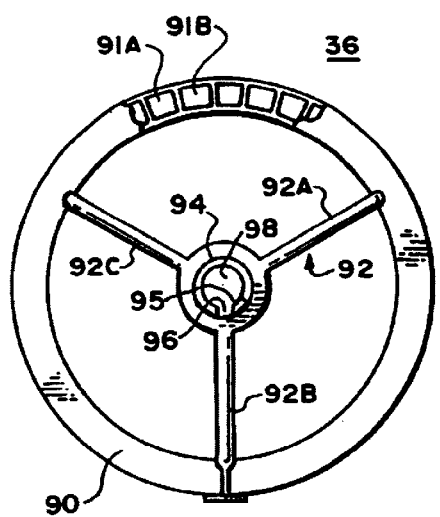

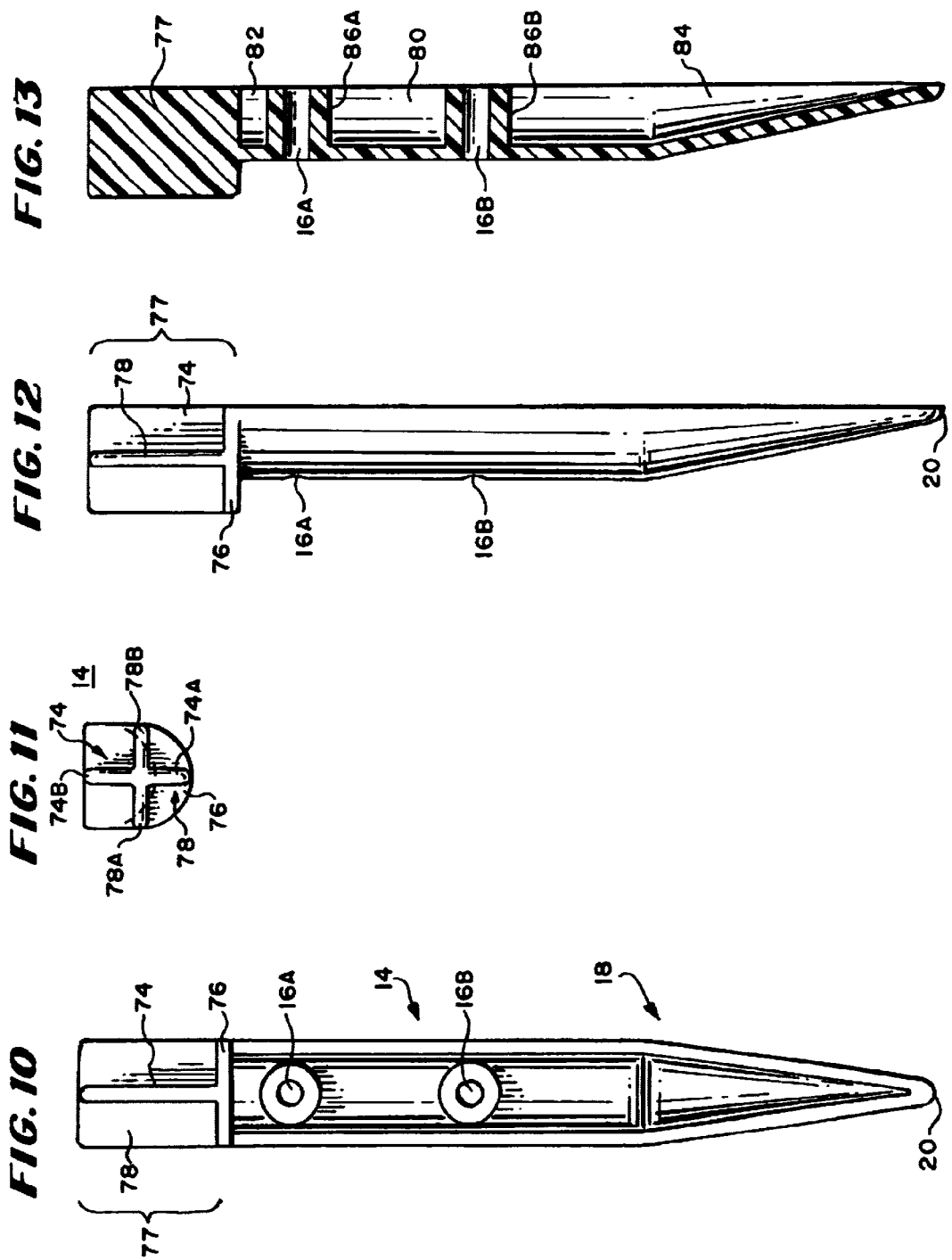

RAIN GAUGE WITH HORIZONTAL INDICATOR

BACKGROUND OF THE INVENTION

This invention relates to rain gauges.

Rain gauges are known that include a rain holder and large numerals and/or words correlating the height of the water in the rain holder with the amount of rainfall. In this class of rain gauge, the rain holder has indications or gradation marks, such as lines, on it to indicate the graduations of water height between the numerals The numerals and/or words are large enough to be read from several yards away.

One prior art type of rain gauge in this class of known rain gauges includes an adjusting mechanism at the top of the rain holder to collect water from a wider area than the cross section of the rain holder so that the water in the rain holder rises at a faster rate than the rainfall but in proportion to the rainfall. This provides room for larger numbers on the rain holder itself to indicate the amount of rain per area that has fallen. This type of device is disclosed in U.S. Pat. No. 5,038,606 granted Aug. 13, 1991 to Robert C. Geschwender, et al.

The prior art rain gauges with large lettering have a disadvantage in that the rain holder must be taller to accommodate large numerals one above the other that indicate the amount of rainfall. This increases the expense of manufacture and difficulty of placement.

Another type of prior art rain gauge has an opening smaller than the diameter of the rain holder at least at some locations and a tapered rain holder that causes the vertical scale to be proportioned differently than conventional rain gauges. This rain gauge has the disadvantage of having a vertical scale.

SUMMARY OF THE INVENTION

Accordingly, it is an object of the invention to provide a novel rain gauge.

It is a further object of the invention to provide a rain gauge in which it is exceptionally easy to read the numerals indicating the amount of rain that has fallen.

It is a still further object of the invention to provide a rain gauge in which the height of the rainfall in the rainfall holder positions rainfall indicators and a pointer with respect to each other along one or more curved paths in a manner that enables the pointer and rainfall indicators to indicate rainfall as determined from the height of the water in the rain holder.

It is a still further object of the invention to have a unique rain gauge which has a horizontal scale calibration.

It is a still further object of the invention to provide a rain gauge with horizontal lettering and means to rotate a floating rainfall indicator in a large diameter rain collector with large scale calibrations.

It is a still further object of the invention to provide a rain gauge in which the amount of rainfall is indicated by lettering, such as numerals or words, in which the numerals and/or words are substantially side by side in one or more horizontal rows rather than one above the other in a vertical column.

It is a still further object of the invention to provide a rain gauge with an exceptionally clear indication of water height on the rain gauge itself.

In accordance with the above and further objects of the invention, the rain gauge of this invention comprises a rain holder, an opening facing upwardly through which rain can fall and a float in the rain holder. It is desirable for the opening to have an area smaller than but proportional to the surface area of water in the rain holder. This water in the rain holder forms the surface on which the float rests. With this arrangement the water height in the rain holder is lower than but proportional to the rainfall. The amount of rainfall is indicated by the relationship between a marker and numerals and/or words that indicate values of rainfall. The marker and numerals and/or words are moveable with respect to each other in a direction at an angle to the vertical to indicate the rainfall.

In the preferred embodiment, the rain holder is covered by an interface having a rainfall opening. The rainfall opening has an area facing upwardly that is proportional to but smaller than the surface area of the water collected in the rain holder so that the water in the rain holder raises to a level, lower than but proportional, to the rainfall value. A float in the rain holder moves both vertically and circumferentially with respect to a stationary member as the float changes height. The change in position of the float and stationary member with respect to each other causes a pointer or other indicator to indicate the amount of rainfall. With this arrangement, the scale indicating rainfall is horizontal rather than vertical.

A pointer can for example be mounted to the float to move with respect to numerals or words on the stationary member indicating the amount of rainfall as the water level in the holder increases. Because the numerals or words indicating the amount of rainfall are horizontal or substantially horizontal to each other and also because they are on a rain holder having a diameter larger than the usual rain gauge in which the surface areas of water in the rain holder have the same area as the openings through which rain falls, the numerals and/or words can be larger than if the numerals and/or words were one over the other and the diameter of the rain holder is the same as the diameter of the opening through which the rain falls into the rain holder. Means are also provided to mount the rain gauge upright and in the preferred embodiment this mounting means is adjustable in position. For example the rain holder can be rotated in position with respect to the holder so that the scale faces in a desired direction.

From the above description, it can be understood that the rain gauge of this invention has advantage of being easily readable from a distance.

SUMMARY OF THE DRAWINGS

The above noted and other features of the invention will be better understood from the following detailed description when considered in connection with the accompanying drawings, in which:

FIG. 1 is a perspective view of an embodiment of rain gauge in accordance with the invention;

FIG. 2 is an elevational view, partly sectioned of the embodiment of FIG. 1;

FIG. 3 is a sectional view of a rain holder useful in the embodiment of FIG. 1;

FIG. 4 is a plan view of the rain holder of FIG. 3;

FIG. 5 is an elevational view of a float useful in the embodiment of FIG. 1;

FIG. 6 is a top view, partly broken away of the float of FIG. 5;

FIG. 10 is an elevational view of a holder or mounting means useful in the embodiment of FIG. 1;

FIG. 11 is a plan view of the embodiment of mounting means or holder of FIG. 10;

FIG. 12 is a right elevational view of the holder of FIG. 10; and

FIG. 13 is a longitudinal sectional view of the holder of FIG. 10.

DETAILED DESCRIPTION

Figure 7:
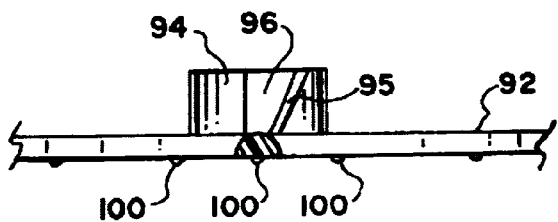
FIG. 7 is a fragmentary view of a portion of the float of FIG. 5.

In FIG. 1, there is shown a perspective view of a rain gauge 10 comprising a measuring section 12 and a mounting means 14. The mounting means 14 in the preferred embodiment includes a plurality of openings 16A and 16B, a shank 18 having a tip 20 and a plug 77 (not shown in FIG. 1) that cooperates with a socket 42 in the measuring section 12 to mount the measuring section 12 to the mounting means 14. While two openings 16A and 16B for fasteners are shown in FIG. 1, any number of openings may be used and adapted to receive fasteners such as those shown at 17A and 17B for fastening to a vertical surface. The tip 20 may be used to insert the rain gauge 10 in the ground for mounting or the openings 16A and 16B may in the alternative be used to receive a fastener or the like so that the rain gauge 10 may be mounted upright by any of a plurality of means. Moreover, there are many alternatives to the plug and socket connection between the measuring section 12 and the mounting means 14 and many different types of mounting means that can be used and are known as equivalents and no attempt to exhaustively list such fasteners or connectors is made herein.

The measuring section 12 includes an interface 30, a rain holder 34 (sometimes referred to as a water holder, rain container, rain collector or water collector or the like) and a float 36. The interface 30 includes an interface cap 31 (FIG. 8) having an interface central opening 32 within a solid portion that includes a tapered cover member 35 with a downwardly turned cylindrical edge 70 (FIG. 2) that fits tightly on top of the rain holder 34 and an increased height cylindrical hub 37 into which the opening 32 extends so that the opening 32 has a smaller diameter than the rain holder 34. In the preferred embodiment, the opening 32 has an opening area that is one-fifth of the area of the cylindrical rain holder 34 but any ratio may be used with the larger ratio in area permitting the larger sized numerals to indicate the amount of rainfall.

The rain holder 34 is a cylindrical open top container that receives on top of it the interface 30 and is able to hold rain water falling through the opening 32 of the interface 30. It also holds a float 36 within the collector 34 for rain water. The rain holder 34 and float 36 include rainfall value indications such as vertical gradation lines, numerals and words and a pointer 38 associated with the rainfall value indications so that as water collects in the rain holder 34, the float 36 rises resulting in circumferential motion in a generally horizontal plane describing a helix with a vertical axis that results in an indication of the amount of rain water that has fallen. The motion is between the scale and the pointer. In the preferred embodiment, the float 36 is rotated as it rises and moves a pointer 38 along rainfall value indications on the transparent wall of the rain holder 34 describing a helix with horizontal turns but any other arrangement which uses the relationship between the position of the float 36 and a stationary member can serve the appropriate function. For example, a cylindrical or partly cylindrical scale indicating the amount of rain water may be rotated as the float 36 rises and falls so that a pointer 38 that is stationary, either on the wall of the rain holder 34 or mounted elsewhere either outside of the rain holder 34 or against the wall, indicates the amount of rainfall by its position with respect to the rotating cylindrical scale.

It has been found that the operation of the rain gauge is drastically affected if the motion of the float is not relatively free of drag and impediments. In the preferred embodiment, drag is reduced by a centrally located motion translator 44 that guides the float but other means may be used if they reduce drag sufficiently.

The scale indicating the amount of rainfall should be visible from a substantial distance such as for example 10 feet to 200 feet away and easily readable from that distance by a person with normal 20/20 vision. The numerals or letters indicating the amount of rain that has fallen are at least one-fourth of an inch in height and at least three-sixteenths of an inch in width with the lines forming the individual digits being about one-sixteenths of an inch wide to provide clear visibility. In the preferred embodiment, the numerals are one-fourth of an inch wide and three-eighths of an inch in height and the width of the lines being approximately an one-sixteenth of an inch.

The numerals or words indicating the amount of rainfall may be staggered in elevation as well as circumferential to each other. In the preferred embodiment the first three numerals, 0, 1 and 2 are at a different elevation than the numerals 3, 4 and 5 and are positioned circumferentially from each other over a portion of the curvature of the cylindrical rain holder 34. Graduation markers 40 in the forms of vertical lines are positioned so that the numerals at a higher level have them extending downwardly from the numerals and those at a lower level have them extending upwardly so that a pointer 38 at different locations of rotation of the float 36 may point at lower levels of water with the vertical lines extending downwardly from the numerals and at a higher level of water the vertical lines extending upwardly from the numerals.

Along the circumference of the walls of the rain holder 34 are the gradation markers shown at 40 and along the circumference of the float 36 and attached thereto is the pointer 38. The float itself 36 is in contact with and associated with a motion translator 44 extending downwardly from the interface 30 along the center of the rain holder 34 so that as the float 36 moves upwardly and downwardly, the translator 44 engages it and rotates it.

While a motion translator 44 in the preferred embodiment is mounted to the interface 30 and extends downwardly through the center of the rain holder 34, it could be mounted to the bottom of the rain holder 34 and extend upwardly as well. Indeed, many different motion translators could be used and serve the same purpose.

A socket 42 is mounted to the bottom of the rain holder 34 to receive the mounting means 14. While a socket 42 is used in the preferred embodiment which has keys for proper orientation with the holder, any other holding device could be used or the holder could be formed integrally with the rain holder 34.

In FIG. 2, there is shown a front elevational view, partly sectioned of the embodiment of rain gauge 10 of FIG. 1, having the measuring section 12, the mounting means 14, with the measuring section 12 having the interface 30 and the rain holder 34 as shown in FIG. 1. As shown more clearly in FIG. 2, the interface 30 has members extending downwardly and mounted to the motion translator 44 and otherwise blocks rain except for the opening 32 which has a diameter of approximately one-half the diameter of the rain holder 34 so that the float 36 will move upwardly at a much slower rate than in the case of an opening of the same area as the rain holder or the type of holder which increases height by having a funnel shaped opening with a larger size than the rain holder. In the preferred embodiment, the inner diameter of the rain holder 34 has a diameter of 2.840 inches and the inner diameter of the opening 32 in the interface 30 is 1.270 inches. These diameters have areas respectively of 6.336 square inches and 1.267 square inches which is a 5 to 1 ratio, but other ratios may be used.

The motion translator 44 includes a straight post or stem 52 having external of it a curved guide track 50 that engages the float 36 and forces it to turn as it rises and falls. It is designed to cause the same number of degrees of turn as the scale on the outer wall of the holder 34. In the preferred embodiment this is a full 180 degrees but could be less or more. For a 180 degree turn, the guide track 50 is formed from one diametrical end all the way around upwardly to the opposite diametrical end on the inner post 52.

The float 36 includes a outer annular ring 90 in the form of a cylinder, a spider 92 and a raised slotted guide hub 94 having the guide slot 96 (FIGS. 6 and 7) which engages the curved guide track 50 in the guide slot 96. On the outer circumference of the ring 90 is mounted the pointer or indicator 38 for orbiting about the center motion translator 44 to indicate the rainfall on the graduation markers 40 (FIG. 1) along the outer wall of the rain holder 34. The socket 42 is sized to receive an upper portion of the mounting means 14 and includes keyways or slots for receiving keys in any of several positions to alight the mounting means 14 with any of several positions of the measuring section 12. While a socket 42 is shown integrally formed with the rain holder 34 and a matching plug 77 (FIG. 10) formed on the mounting means 14, the socket 42 may instead be in the mounting means 14 and the plug 77 integrally formed with the rain holder 34. Alternately, the rain holder 34 and the mounting means 14 may be integrally formed together or held together by any other means such as for example they may contain flat upper surfaces held together by fasteners or no mounting means at all may be used. It is only important that provision be made to position the rain holder 34 in a functional manner. If a mounting means is used, it need not be located vertically with respect to the rain holder 34 but can be side-by-side if desirable.

In FIG. 3, there is shown an elevational sectional view of the rain holder 34 having cylindrical walls 53 with an annular recessed section 54 and a raised section 56 to hold water. In the upper periphery of the wall 53 is a notch 59 positioned to receive a key 72 (FIG. 9) extending inwardly from the rain interface 30 to align the central motion translator 44 (FIG. 2) with the pointer 38 on the float 36. At the bottom, extending downwardly is the socket 42 having a central opening with keyways or slots to receive keys of the mounting means 14. At the top of the walls 53 is an outwardly extending top rim 61. Outwardly extending keys may be incorporated outside of the bottom socket 42 of the rain measuring section for alignment in those embodiments in which the mounting means 14 ends in a socket with keyways rather than a plug with keys. By including them outside either type of holder may be used. In the embodiment of FIG. 2, the keyways are internally to the socket 42 and engage outwardly extending keys for alignment with the mounting means 14 to be described hereinafter.

In FIG. 4, there is shown a plan view of the rain holder 34 of FIG. 3 showing the central socket 42 that receives a plug 77 (FIG. 10) and which has the internal keyways 65 of center portion 58 for alignment with the mounting means 14 (FIG. 2), the center raised section 56, the notch 59, and the annular recessed section 54. The annular recessed section 54 is adapted to receive the outer periphery of the float 36 in a manner to be described hereinafter. The inner socket 42 has in its center portion 58 a plurality of spaced apart keyways 65 sized to receive the extending keys 74A, 74B, 78A, and 78B (FIG. 11) on cross plates 74 and 78 of mounting means 14 (FIG. 2). Because the four extending keys 74A, 74B, 78A and 78B (FIG. 11) at the top of the mounting means 14 (FIG. 2) can fit into any of a number of the keyways 65, the socket 42 may be positioned at a number of circumferentially located positions. The recessed portion 54 is shaped to receive the outer rim of the float 36 (FIG. 2), both being shaped as toroids. With this arrangement, the water flows into the recessed portion 54 and under the torus-shaped outer ring 90 of the float 36 which has outwardly extending projections 100 (FIG. 7) to permit the water to flow under it and lift the float 36 without adhering by surface tension within the recessed portion 54 of the rain holder 34.

In FIG. 5, there is shown an elevational view of the float 36 having the lower outer ring 90 to which the pointer 38 is fastened, an upper member spider 92 and a hub 94. The hub 94 is formed integrally with the center of the spider 92 and extends vertically therefrom having including an opening 98 with a guide slot 96 adapted to engage the outwardly extending guide track 50 of the motion translator 44 (FIG. 2) to guide the float 36 and pointer 38 circumferentially. In one embodiment, the float 36 is spaced from the recessed section 54 (FIG. 4) by the central raised section 56 (FIG. 4) and in another there are projections 100 from the bottom of the float 36 (FIG. 7) to break surface tension and permit easy floating when water flows under the float. The lower outer ring 90 of the float 36 has a height of 140 thousandths inch, the spokes of the spider 92 has a height of 0.063 inch and the bottom of the spokes of the spider 92 is spaced from the top of the outer ring 90 by 0.062 inch. The height from the bottom of the float 36 to the top is 438 thousandths inch.

In FIG. 6, there is shown a plan view of the float 36 showing the central opening 98, slot 96, hub 94, spider 92 and outer ring 90. As shown in this view, the central hub 94 has a central opening 98 with an outwardly extended slot 96 that loosely fits over the elongated guide track 50 of the motion translator 44 (FIG. 2) that extends upwardly on the post 52. One side 95 of the slot 96 is at an angle corresponding to the angle of the guide track 50. With this arrangement, the slot 96 is forced to follow the curve of the guide track 50 as it moves upwardly or downwardly causing the pointer 38 to move circumferentially with the motion of the float 36 upwardly or downwardly.

The spider 92 includes three radially extending legs 92A–92C, each having a width of 125 thousandths and connecting the hub 94 to the outer ring 90. The outer ring 90 has an outer diameter of 2.695 inches and a width of 250 thousandths. The underside of the outer ring 90 includes a plurality of circumferentially spaced apart pockets 91A, 91B etc. extending along the bottom side but not extending through the upper ring 90, used to trap air under the ring 90 for buoyancy as well as to thin the walls of the ring and thus reduce its weight. In the preferred embodiment, they are spaced 30 thousandths from each other and have walls 30 thousandths inch radially and circumferentially in size. The slot 96 is 83 thousandths wide and extends 250 thousandths inch through the center of the hub 94. The diameter of the opening 98 is 270 thousandths and the diameter of the hub 94 is one-half inch.

In FIG. 7 there is shown a fragmentary view of a portion of the float 36 of FIG. 5 including the hub 94 and spider 92. This embodiment is identical to the embodiment of FIGS. 5 and 6 except that the hub 94 and/or the spider 92 has projections 100 extending from its bottom to raise the float 36 slightly from the water holder 34 and permit water to flow under it to easily lift the float 36. Of course, still other means are available to provide space for water to flow and reduce surface friction effects such as raised portions in the bottom of the water holder 34. Because, even with the projections 100 and the annular recess 54, the movement of the float at the bottom is delayed. Graduation markers 40 (FIG. 1) are adjusted accordingly to accommodate the delay of the float 36 to reasonably record low amounts of rainfall under one inch. These value indications are shifted progressively closer to each other from one inch down to zero to accommodate the delay of the float.

Figure 8:
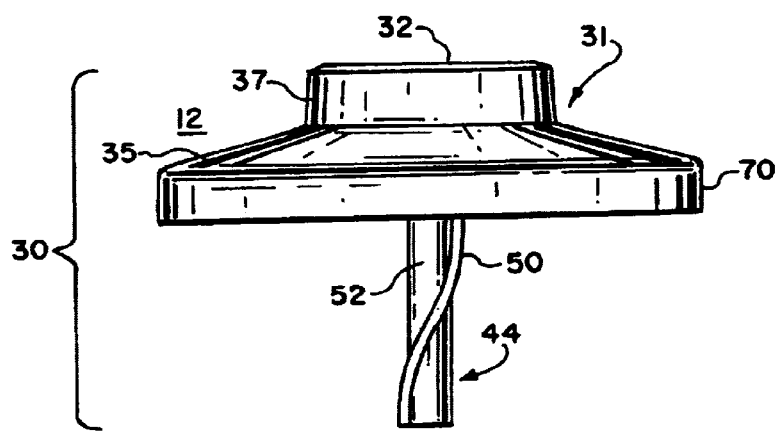
FIG. 8 is an elevational view of an interface useful in the embodiment of FIG. 1.

In FIG. 8, there is shown an elevational view of the interface 30 having the cap 31 attached to the motion translator 44. The motion translator 44 includes the straight post 52 and the curved guide track 50. The straight post 52 extends vertically along the center line of the interface 30 and of the rain holder 34 and supports the curved guide track 50 that extends along its length, curving around the straight post 52 so as to have each different portion of the guide track 50 at a progressively different circumferential position of the straight post 52 to form a raised portion that can guide float 36 around the post 52 as the float moves vertically. Thus, the guide track 50 of the motion translator 44 curves as it extends downwardly on the post 52 starting at the top adjacent to the interface 30 and curving 180 degrees to the bottom of the post 52 to permit the float 36 to rotate 180 degrees from top to bottom of the post 52. The rainfall values from the bottom of the 180 turn to the top are 5 inches in the preferred embodiment but the curvature of the guide track 50 may be altered to provide a larger or smaller scale but must correlate with the movement of the pointer 38 and the volume of water collected to indicate the correct rainfall.

In the preferred embodiment the height of the water collected in the water collector 34 is one inch and the guide track 50 moves through 180 degrees in the one inch. The pointer 38 indicates zero inches of rainfall at the lower end of the 180 degree turn and five inches at the upper end, one inch vertically upwardly in the rain collector 34. The height of the water in the water collector 34 and the rainfall is correlated by having the area of the opening 32 be one fifth the area of the inside of the water collector 34. Thus, as water lifts the float 36, the pointer 38 moves from a zero indication on the wall of the rain holder 34 to 180 degrees from that position as the float 36 reaches the top guided by the outwardly extending guide track 50 within the slot 96 in hole 98 of float 36.

In the preferred embodiment, the ratio of one to five in the area of the opening 32 to the area of the surface of the rain holder 34 is obtained with an opening 32 having an inner diameter of 1.272 inch and an inner diameter of a rain collector 34 that averages 2.844 inches in diameter. The pitch per inch of the guide track 50 which is shaped as a screw is selected so that the circumferential motion of the pointer 38 covers the same distance as the scale of values of rainfall, which in the preferred embodiment is zero to five inches as the water in the rain holder 34. The ratio of the area of the opening 32 in the interface 30 to the average area of the surface of the water in the rain holder 34 is adjusted to be proportional to the pitch per inch of the curved guide track 50.

In the preferred embodiment the ratio of area of the opening 32 and surface of the water in the rain holder is 5 to 1; therefore, 1 inch of rain water passing through opening 32 collects as one fifth of an inch in the rain holder 34 and since the graduation markers 40 are from zero to five inches around 180 degrees of the rain holder 34, the guide track 50 must rotate the arrow 38 on ring 90, 36 degrees for one inch of rainfall. Therefore, the guide track 50 curvature is 36 degrees per one fifth of an inch of rise. The inner diameter of the rain holder 34 and the pitch of the curved guide track 50 must be such that the rain holder 34 may collect sufficient water for the bottom value of rainfall of interest to be easily detected and shown by a visible positioning of the pointer 38 and yet the maximum value of rainfall of interest and all the values of interest in between be shown with adequate precision on a side of the rain holder 34 visible to the viewer.

The cylindrical hub 37 of the cap 31 of the interface portion 30 has an outer diameter of 1.395 inch and an inner diameter defining the opening 32 at the top of 1.270 inch with an inner slope of 5 degrees per side. Its height is one-fourth inch. The cylindrical edge 70 of the cap 31 has an outer diameter of 3.260 inches and an inner diameter of 3.100 inches with an inwardly projecting snap-lock cylindrical-detent 107 (FIG. 2) sized to snap over the top rim 61 of the rain holder 34.

Figure 9:
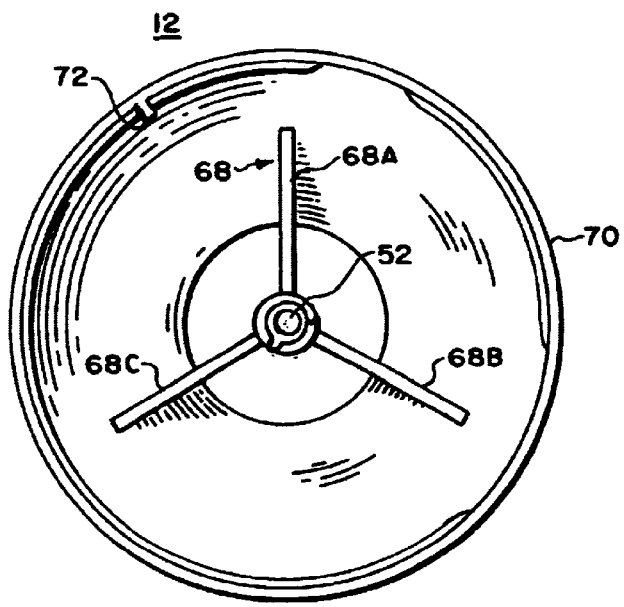
FIG. 9 is a bottom view of the interface of FIG. 8.

In FIG. 9, there is shown a bottom view of the interface cap 30 and motion translator 44 illustrating the spokes 68A–68C of a spider 68 that mount the straight post 52 to the bottom of the interface wall 35. As shown in this view and in FIG. 9, the downwardly extending cylindrical edge 70 of the cap portion is shaped to fit over the external rim of the cylindrical wall 53 of the rain holder 34 (FIG. 3). The inwardly extending key 72 is shown adapted to fit within the slot 59 of the rain holder 34 (FIG. 4).

In FIG. 10, there is shown an elevational view of the mounting means 14 of the rain gauge 10 (FIG. 1) having a plug portion 77, a shank 18 and a tip 20 with the openings 16A and 16B being within the shank 18. The plug portion 77 fits within the socket 42 (FIG. 3) on one end of the shank 18 and the relatively pointed tip 20 being on the other end of the shank 18. At the top, is shown the plug 77 that fits within the socket 42 of the rain holder 34 (FIG. 2) including outwardly extending cross plates 74 and 78, one of which is shown extending outwardly at 74A and a bottom stop ridge is shown extending length wise at 76. The key 74A is shaped to align with any selected one of the openings between keyways 65 of center portion 58 (FIG. 4) of the rain holder socket 42.

In FIG. 11, there is shown a top view of the mounting means 14 showing the extending cross plates 74 and 78 forming keys 74A, 74B, 78A and 78B which fit within the keyways 65 of the center portion 58 of the socket 42 and the bottom stop ridge 76 that is outside of the socket 42 when the rain holder 34 is mounted to the mounting means 14. As shown in FIG. 12, the stop or ridge member 76 extends slightly outwardly from the shank 18 with the two cross plate members 74 and 78 extending outwardly above it to engage the inner keyways within the socket 42. The tapered portion at the bottom of the shank 18 shows the taper in another direction tapering downwardly.

In FIG. 13, there is shown a sectional view illustrating the through opening 16A and 16B adapted to receive a fastener. Recesses 82, 80 and 84 are positioned to reduce the thickness of plastic walls to make fabricating more economical. In the preferred embodiment, the tip portion 20 is 2 inches long, the shank 18 is 3 inches long and the socket 42 is 1 inch long. The end of the tip 20 has a radius of 90 thousandths and the openings 16A and 16B are spaced 1.25 inch from each other and have a 188 thousandths diameter with bosses 86A and 86B having a diameter of 438 thousandths. The cross plates 78 and 74 and bottom stop ridge 76 have thicknesses of 94 thousandths.

The rain gauge 10 may be easily fabricated by injection molding the portions, namely the mounting means 14, the rain holder 34, the interface cap 30 and the float 36. The indications may then be placed on the rain holder 34. In use, the mounting means 14 may be fastened to a vertical surface by means of fasteners within the openings 16A and 16B or may be mounted into soil by pressing the tip 20 down or may be hung from a vertical fence or any other suitable means. The viewer may then position the rain holder 34 so that the indications are in the direction that the viewer will be looking and the socket 42 inserted over the top of the mounting means 14 so that the cross plates 74 and 78 extending outwardly from the mounting means 14 fit within the grooves of the socket 42 when the indications are facing in the direction of the viewer. The float 36 may then be positioned around the straight post 52 with the raised 180 degree extending portion guide track 50 fitting within the notch 59 of the hub 94 and the interface 30 positioned over the top of the cylindrical wall 53 with the key 72 (FIG. 9) fitting within the notch 59 (FIG. 4) of the wall 53 (FIG. 3) so as to align the raised curved guide track 50 with the float 36 having its pointer 38 facing the indications.

As rain falls through the reduced size opening 32 within the interface cap 30 and drops into the rain holder 34, it flows under the float 36 and slowly raises the float 36. The float 36 has small projections 100 on its bottom surface, so that it does not adhere to the bottom of the inner rain holder 34 and they permit water to flow under it and begin lifting it. As it moves upwardly, it turns, being controlled by the guide track 50 on the straight post 52 to move radially with the pointer 38 indicating the amount of rainfall. Because the diameter of the rain holder 34 is larger than the diameter of the opening 32, the float 36 moves less vertically than the amount of rainfall but because the vertical movement is proportional, the ratio of the circumferential movement of the pointer 38 on the float 36 moves circumferentially by the rainfall numbers to indicate the amount of rainfall.

From the above description, it can be understood that this invention has the advantage of being easy to read from a distance.

While a preferred embodiment of the invention has been described with some particularity, many modifications and variations in the invention are possible within the light of the above teachings. Therefore, it is to be understood that, the invention may be practiced other than as specifically described.

What is claimed is:

1. A rain gauge comprising:
    a rain holder; and
    means for indicating an amount of rainfall on a horizontal calibration scale;
    said means for indicating the amount of rainfall comprising: a float in the rain holder; and lettering indicating amounts of rainfall on said rain holder together forming a rainfall value indicator arranged so that as the float moves vertically in the rain holder a pointer mounted on said float and the lettering indicating amounts of rainfall move circumferentially with respect to each other to indicate the amount of rainfall.

2. A rain gauge in accordance with claim 1 in which the float includes means for trapping air whereby buoyancy of the float is increased.

3. A rain gauge in accordance with claim 1 in which the rain holder includes a rainfall opening through which rainfall passes; said opening being smaller in area than a horizontal area in the rain holder defining a water surface, whereby the water surface in the rain holder raises less than but In proportion to the amount of rainfall.

4. A rain gauge in accordance with claim 3 in which a diameter of the rain holder is larger than a diameter of the opening and a rainfall value indicator includes lettering indicating rainfall with the lettering being spaced circumferentially whereby larger letters and numerals comprising the lettering may be used than with rain holders in which the rainfall value indicator includes lettering indicating rainfall with the lettering being spaced vertically.

5. A rain gauge in accordance with claim 1 in which the pointer is on the float and the float is mounted to a vertical screw so as to rotate as it floats vertically, the lettering being on the rain holder, whereby the pointer points to said lettering.

6. A rain gauge in accordance with claim 5 in which the lettering includes at least some numerals in one row along the circumference of the rain holder and other numerals along a higher row along the circumference whereby the pointer is in juxtaposition with the numerals as it changes elevations.

7. A rain gauge in accordance with claim 5 in which a pitch per inch of the vertical screw is proportional to the ratio of an area of the surface of water in the rain holder to the area of a rainfall opening.

8. A rain gauge in accordance with claim 1 in which at least some indications of rainfall value forming a portion of the rainfall value indicator are numerals having a size that is easily readable from a distance.

9. A method of using a rain gauge comprising the steps of:
    mounting a cylindrical tube with a closed bottom and an internal diameter vertically at a first location where the cylindrical tube will receive rain within sight of a second location of a viewer wishing to determine rainfall;
    placing a float with a circumference less than the internal diameter of the cylindrical tube within the cylindrical tube whereby the float will float as rainfall accumulates in the cylindrical tube with the cylindrical tube including lettering indicating rainfall values in a horizontal scale and the float including a pointer;
    turning the lettering indicating rainfall values toward the viewer;
    causing the pointer to turn as the float changes its vertical position due to an accumulation of water in the cylindrical tube wherein the pointer indicates a value of rain fall by the position of the pointer with respect to the lettering; and
    viewing the relationship between the pointer and the lettering to determine the amount of rainfall from the second location.

* * * * *